Oct. 18, 1938.    V. A. SHEALS    2,133,405
OIL FILLED CABLE AND MEANS FOR JOINTING THE SAME
Original Filed Jan. 16, 1929
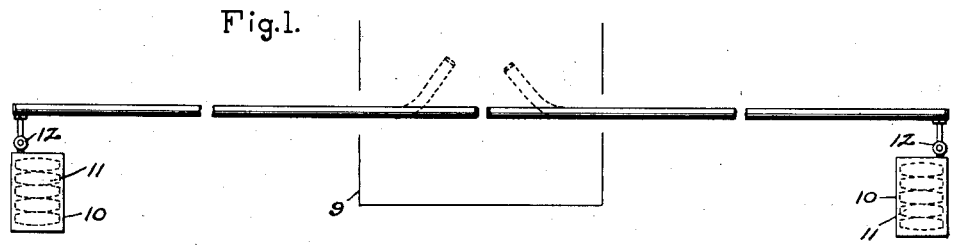
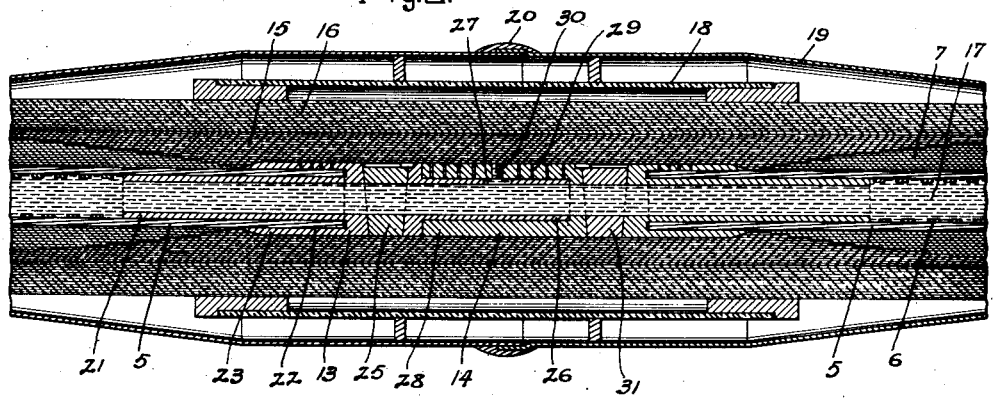
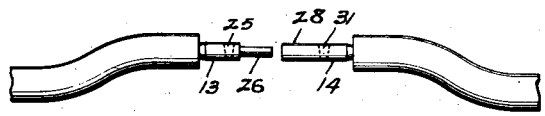
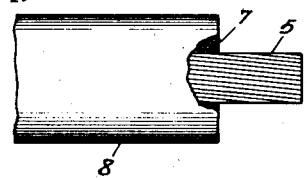
Inventor:
Vincent A. Sheals,
by Charles E. Mullan
His Attorney.

Patented Oct. 18, 1938

2,133,405

UNITED STATES PATENT OFFICE 2,133,405

OIL FILLED CABLE AND MEANS FOR JOINT-
ING THE SAME

Vincent A. Sheals, Schenectady, N. Y., assignor
to General Electric Company, a corporation of
New York Application January 16, 1929, Serial No. 332,905
Renewed September 21, 1933

14 Claims. (Cl. 173—268)

In the manufacture and installation of cable having one or more well defined oil channels, it is preferable to perform all insulation treating operations at the factory where the facilities are best and to ship the cable filled with oil to the place where it is to be installed. This requires, of course, that the ends of the cable be sealed to prevent the escape of oil or the entrance of air. In order to prevent the expansion and contraction of the oil within the cable sheath, due to changes in external temperature, from adversely affecting the cable as a whole, it is desirable to provide one end of the cable with a reservoir containing oil and having provision for taking care of changes in volume of the oil within the cable itself. Jointing one section of such a cable with one or more adjacent sections presents certain serious difficulties due chiefly to the presence of a relatively large body of oil within each section and to the importance of keeping air and moisture out of the cable. It is evident that unless special means are provided the oil will drain from the cable as soon as it is opened and that as the oil leaves it, air is bound to enter, which air must be fully removed before the cable can be used and fresh oil admitted.

My invention has for its object to provide a means or arrangement for jointing oil filled cable sections without drawing oil from them except for a negligible amount at the extreme ends, on the one hand, or admitting air thereto, on the other. My invention further comprehends a method of procedure in installing and jointing such cable sections.

For a consideration of what I believe to be novel and my invention, attention is directed to the accompanying description and the claims appended.

In the accompanying drawing, which illustrates one embodiment of my invention, Fig. 1 is a diagrammatic view of a cable with the ends to be jointed located in a man-hole; Fig. 2 is a longitudinal section of a cable joint; Fig. 3 is a detail view illustrating a partly formed joint; and Fig. 4 is a detail view of a piece of single conductor high tension cable.

5 indicates the conductors of a high tension cable which are stranded over a spirally-wound hollow, metallic core 6. Surrounding the conductors is a body of suitable insulation 7, usually of tightly wound oil impregnated paper. Outside the paper is a sheath 8 made of lead or equivalent material. 9 indicates a man-hole into which project the opposed ends of two cable sections. Each section is laid in a conduit of any desired construction, and is provided at one end with a suitable reservoir 10 to take care of changes in volume of the oil within the cable section in transit and while awaiting installation. The reservoirs also perform a function in the method followed in jointing. They may be so small as to be used only temporarily, or they may be large enough to form a part of the permanent installation. A convenient arrangement for this purpose is to make them of such size that they may be mounted within the reel on which the cable is wound for shipment. The reservoirs should be provided with means permitting the expansion and contraction of the oil without causing injury to the sheaths or the formation of voids within the cable. A means suitable for the purpose comprises an hermetically sealed tank 10 within which is one or more sealed cells 11, the walls of which are free to expand and contract with respect to each other with changes of volume of the oil. They may contain a gas under pressure above atmosphere if desired. The reservoir is piped to the interior of the sheath, and in the pipe, which is preferably flexible, is a valve 12 by means of which the passage of oil to and from the reservoir can be controlled.

In Fig. 2 is illustrated a longitudinal section of a joint in which 5 indicates the conductors, 7 the paper insulation, 13 and 14 the parts of the connector which is of special construction, 15 and 16 are insulating tapes wound over the connector and the adjacent parts of the factory wound conductor insulation. 17 indicates the body of oil which completely fills the core of the cable and permeates the paper insulation. Surrounding the tape insulation is a suitable cylindrical barrier 18 which in turn is enclosed within a two part casing 19, the ends of the latter being hermetically sealed to the cable sheaths, as by wiped soldered joints. The parts of the casing are soldered, as at 20.

The connector comprises two principal parts, or members, a male 13 and a female 14, as shown in Figs. 2 and 3. Considering first the part 13, it is provided with a tubular extension 21 which is inserted within the bore of the cable. For this purpose a portion of the core 6 is removed, or in some cases it may be pushed back within the cable to afford the necessary space. Cooperating with the extension to form a socket 22, is the part 23, the latter having numerous small openings to receive solder to fasten the conductors 5 in the socket. In the main body of the connector is a valve comprising a tapered plug 25 having an opening which registers with the bore of the connector. When in the position shown, a through passage is provided for the oil. When turned to a position 90° therefrom, the passage of oil is shut off. The head of the valve is suitably shaped to receive a wrench for turning it. The portion of the connector at the right of the valve is in the form of a tube or sleeve 26, the internal diameter or bore of which corresponds to the valve opening, and the external diameter to the internal diameter of the adjacent end of the female connector 14. The sleeve is also provided with radial opening 27 of sufficient size to insure registration with radial opening in the second connector so that any trapped air between valves may be removed, as will appear later.

The female connector part 14 is of essentially the same construction as the other with the exception that the left hand tubular part 28 is large enough to receive the tube or sleeve 26 of the male connector and is also provided with numerous small radial holes 29 through which hot solder can flow to make a good mechanical and electrical joint. It is also provided with a small radial hole which registers with the inner hole or opening 27 to permit of the discharge of entrapped air and which in the finished joint is closed by a screw threaded plug 30. The valve 31 in this part of the connector is the same in construction as the valve 25 and may be opened and closed independent of the latter. When assembled as shown in Fig. 2 the two parts of the connector are in telescopic relation.

Assuming that it be desired to unite two cable sections which are properly installed in the conduits, the procedure, referring to the left-hand section first, is as follows: The valve 12 is closed to relieve the cable section of the pressure due to the reservoir 10. The end of the cable in the man-hole is bent upwardly, as shown in Fig. 1, by a sufficient amount to form an oil trap so that air cannot get into the core of the cable. The end of the cable sheath and a part of the insulation is then cut off and a small amount of oil removed from the core so as not to interfere with the soldering or sweating of the connector part 13. The connector part is then mounted in place on the conductor end and soldered. To flush out any air or gas which may be trapped in the upturned end of the cable the valve 12 at the other end of the section is opened and the reservoir forces oil through the cable and discharges it, and any trapped air through the end of the connector, after which the connector valve 25 is closed. The other part of the connector is then mounted in a similar manner and after its associated cable section has been properly freed of trapped air by opening the valve 12 of its reservoir, the connector valve 31 is closed.

Having properly mounted and soldered the connectors on the cable ends, the connector parts are brought into alignment and the parts telescoped or positioned, as shown in Fig. 2, after which they are soldered. Although these cables are heavy and relatively stiff they are so brought into the man-hole that the necessary endwise movement of one part of the coupling with respect to the other can be readily made.

From the description thus far it will be seen how trapped air is removed from the ends of the cable sections and how the ends are filled with oil. The next step after soldering is to remove trapped air from within the connector itself, i. e., that portion between the valves 25 and 31. This is done by opening one or the other of these valves by a suitable amount and slowly letting oil from one section feed into the space. Any oil in said opening will be discharged through the radial and registering holes. After oil begins to flow from the hole the plug 30 is screwed into place. Having removed all of the air from the system and established the proper relation of parts, the valves 25 and 31 are both opened. After the oil circuit is established, there being a pressure on the oil slightly above atmosphere due to the oil reservoir, the valves may be locked in position as by a small amount of solder at the top. The jointer then proceeds to make the joint in any suitable way. As shown the factory wound insulation is removed to form steps and later the connector and the adjacent insulation is covered with tape or tapes and any other protecting means that seem desirable. While this is being done the seepage of oil through the insulation displaces any trapped air in the insulation itself. When the joint is properly finished the casing parts are moved into position and soldered to each other at the center and at their ends to the cable sheaths. A vacuum is then established within the casing to remove any trapped air after which the casing is filled with oil.

In case of trouble with a section or for any other reason, the joint coverings can be removed and by closing the connector valves the oil in one cable section can be cut off or isolated from that in the other. This permits one section to be drained of oil, vacuum or otherwise treated, and fresh oil supplied without affecting the other section, or a cable section can be removed and a new one filled with oil substituted, and this without loss of oil and what is of the greatest importance the admission of air and moisture to the uninjured section is prevented. A new section may be connected to an old section if desired by following the method outlined.

The procedure is the same, section by section as the cable is laid, the pipes from the reservoirs 10 being of such a character and so located that they do not interfere with the jointing operations. In some cases it is preferable to lay all of the cable sections and then carry out the jointing operations.

The reservoirs are of the so-called "pressure type" and are preferably located under ground, but I may use elevated reservoirs and depend upon the gravity head to force oil through the cable, or a combination of both may be used, the source of oil supplied being immaterial so long as it is capable of performing the desired functions outlined.

Instead of depending upon the flow of oil to discharge air which may have been trapped in the cable parts during the jointing operations I may utilize any other suitable means or method for withdrawing the air as for example by the use of a vacuum in any of the well recognized ways.

I am aware of the patent of Francis V. Calvert No. 2,089,052 issued August 3, 1937 on an application filed January 16, 1929, and make no claim to the invention disclosed therein.

What I claim as new and desire to secure by Letters Patent of the United States, is:

1. The method of jointing cable sections which are filled with fluid insulation which comprises bending the ends of the sections upwardly to form fluid traps, attaching parts of a hollow connector to the adjacent conductor ends, supplying fluid under pressure to each section to discharge any trapped air through the connector parts, shutting off the flow of fluid from the connector parts, uniting the parts of the connector, and establishing a through passage from one section to the other.

2. The method of jointing oil filled sections of a cable having sealed ends which comprises connecting a controllable source of oil under pressure to one end of each section, bending the opposed ends of the sections upwardly to form oil traps, attaching a hollow connector part to each of the said opposed ends, admitting fluid from said sources to flush out any air from within the sections and connector parts, closing the passages through the connector parts to stop the flow of oil therefrom, uniting the parts of the connector, flushing trapped air out of the body of the connector and establishing a through passage for the oil from one section to the other.

3. A connector for joining the adjacent ends of hollow, fluid filled electric conductors comprising two principal members, each member having a tubular extension adapted to enter the bore of and be secured to a conductor, and also a second hollow extension arranged to telescope with a corresponding part of the other member, and a valve whereby the flow of fluid through the connector from one conductor to the other may be controlled.

4. A connector for joining the adjacent ends of hollow, fluid filled electric conductors comprising a pair of hollow members each of which has a tubular portion adapted to enter the bore of a conductor, a second portion concentric with the first forming a socket to receive a cable end and a tubular extension, said extensions being arranged in telescopic relation and having registering openings through which fluid may flow outwardly from the interior, a valve in each member, said valves being situated on opposite sides of said openings, and means for closing said openings.

5. In a cable joint, the combination of a pair of sheathed cables both having hollow insulated conductors containing insulation in fluid form, a hollow connector having a part attached to each cable end for electrically uniting them, and also forming a conduit through which fluid normally flows from one conductor to the other, a valve means in each part of the connector for shutting off the flow of fluid from the conductor and also preventing the entrance of foreign matter thereto while the conductors are being prepared for jointing, a wrapping of insulation for the connector and adjacent ends of the insulation on the conductors, and a casing enclosing the parts of the joint which is sealed at its ends to the cables.

6. In a cable joint, the combination of a pair of sheathed cables having hollow insulated conductors both containing insulation in fluid form, hollow connectors having overlapping connected ends attached one to each of the conductors for electrically uniting them and when united forming a through passage for fluid, a valve means in each connector for shutting off the flow of fluid from and the admission of air to the conduit to which it is connected, insulation for the joint, and an enclosing casing sealed to said sheaths.

7. In a cable joint, the combination of a pair of cables having hollow insulated conductors both containing insulation in fluid form, hollow connectors having overlapping connected ends attached one to each of the conductors for electrically uniting them and when united forming a through passage for fluid, a valve means in each connector for shutting off the flow of fluid from and the admission of air to the conduit to which it is connected, a tightly applied tape wrapping for insulating the connectors and the adjacent ends of the cables, and an enclosing casing.

8. A joint for uniting a pair of insulated cable conductors having hollow cores filled with insulation in fluid form which comprises a connector for uniting the conductor ends, said connector comprising a pair of hollow members in telescopic relation and affording a through passage for fluid from conductor to conductor, a valve means in each of said members to shut off the escape of fluid from and the entrance of air to its conductor, means for maintaining pressure on the fluid within the conductors, insulation for the connector and connected parts, and an enclosing casing for the ends of the cable and the connector.

9. A cable joint comprising a casing, hollow cables containing fluid extending through the ends of the casing, a divided connector for electrically uniting the cable ends and forming a fluid passage, a valve means for each part of the connector by means of which the flow of fluid from the cables may be controlled during the jointing operation, and a body of insulation for the connector and cable ends.

10. In a cable joint, the combination of a pair of cables having hollow insulated conductors both containing insulation in fluid form, hollow connectors having sockets to receive the conductors and overlapping ends for electrically uniting them and when united forming a through passage for fluid, a valve means in each connector for shutting off the flow of fluid from and the admission of air to the conduit to which it is connected, a tightly applied tape wrapping for insulating the connectors and the adjacent ends of the cables, and an enclosing casing.

11. A cable joint comprising a casing, hollow cables extending into the casing through the ends thereof, having impervious sheaths and containing fluid insulation, a two part connector for electrically uniting the cable ends, each of said parts having a socket to receive a conductor end and also an axially extending member, said members being in telescopic relation and having registering openings through which air between the conductor ends may be removed, a valve in each part of the connector for preventing the admission of air to the cable end during the jointing operation and the escape of fluid insulation, and means for insulating the connector and cable ends.

12. The method of uniting the ends of a pair of hollow cables each having connected thereto a source of fluid supply under pressure and filled with fluid which comprises shutting off the supplies of fluid to both cables, opening the ends of the cables and affixing to each a hollow half connector, admitting fluid from said sources to the cables to flush out any foreign matter which may have entered the cables and connector while the half connectors were being affixed, shutting off the escape of fluid through the connectors from the cables, electrically and mechanically uniting the connectors, establishing a through connection between the cables, and finally insulating the parts.

13. The method of uniting the ends of a pair of installed cables of the hollow fluid filled type each having a controllable source of fluid supply under pressure, which comprises treating each cable as follows:—shutting off the supply of fluid thereto, opening the end of the cable spaced from the source of supply, temporarily restricting the escape of fluid from said end, affixing a hollow connector thereto, and admitting fluid to the cable from said source to flush out any impurities in said end and connector; then uniting the two connectors, establishing communication between the cables through the connector, and finally insulating the parts.

14. The method of uniting the ends of a pair of sheathed hollow cables each filled with thin fluid insulation that tends to freely flow therefrom which comprises removing parts of the sheath and insulation to expose the conductors, mounting thereon the parts of a divided hollow connector, restricting the admission of air to the cables while mounting the connectors in place, permitting fluid to flow independently from both cables through the connector parts to flush out impurities, uniting the parts of the connector, permitting fluid to flow from one cable through the connector to flush out the air therein contained, sealing the connector, and finally establishing a through connection between the cables.

VINCENT A. SHEALS.